US009278889B2

(12) United States Patent
Rayner et al.

(10) Patent No.: US 9,278,889 B2
(45) Date of Patent: Mar. 8, 2016

(54) METHOD OF REINFORCING IRREGULAR STRUCTURES

(75) Inventors: Terrence John Rayner, London (CA); David John Hastings, London (CA); David Edward Livingstone, London (CA)

(73) Assignee: 3M INNOVATIVE PROPERTIES COMPANY, St. Paul, MI (US)

( * ) Notice: Subject to any disclaimer, the term of this patent is extended or adjusted under 35 U.S.C. 154(b) by 0 days.

(21) Appl. No.: 13/696,705

(22) PCT Filed: May 10, 2011

(86) PCT No.: PCT/US2011/035870
§ 371 (c)(1),
(2), (4) Date: Nov. 7, 2012

(87) PCT Pub. No.: WO2011/143179
PCT Pub. Date: Nov. 17, 2011

(65) Prior Publication Data
US 2013/0051918 A1    Feb. 28, 2013

Related U.S. Application Data

(60) Provisional application No. 61/333,829, filed on May 12, 2010.

(51) Int. Cl.
*E21D 5/00* (2006.01)
*C04B 41/00* (2006.01)
(Continued)

(52) U.S. Cl.
CPC ............. *C04B 41/009* (2013.01); *C04B 41/52* (2013.01); *E21D 11/38* (2013.01); *C04B 2111/00724* (2013.01)

(58) Field of Classification Search
CPC ........ C04B 41/45; C04B 38/00; C04B 40/00; C04B 24/24; C04B 41/009; C04B 41/52; E21D 11/38
USPC ........................... 405/146, 150.1, 150.2, 268; 118/641–643; 427/407.1, 421.1
See application file for complete search history.

(56) References Cited

U.S. PATENT DOCUMENTS 3,654,370 A    4/1972   Yeakey
3,730,919 A *  5/1973   McGinn et al. ................. 521/51
(Continued)

FOREIGN PATENT DOCUMENTS

AU    779419    9/2002
AU    784695   12/2002
(Continued)

OTHER PUBLICATIONS

*ACG Australian Centre for Geomechanics* 2009 Section, pp. 7-12.
(Continued)

*Primary Examiner* — David Bagnell
*Assistant Examiner* — Carib Oquendo
(74) *Attorney, Agent, or Firm* — Emily Van Vliet; Stephen Crooks

(57) ABSTRACT

The present disclosure provides a method for reinforcing irregular rock or irregular concrete surfaces such as rock structures in mines as well as other rock and concrete structures. The method includes applying a curable foam composition to at least a portion of a surface, at least partially curing the curable foam composition to form a foam layer adhered to the surface, applying a curable reinforcing composition onto at least a portion of the foam layer, and at least partially curing the curable reinforcing composition to form a reinforcing layer, wherein at least a portion of the reinforcing layer is adhered to the foam layer.

17 Claims, 4 Drawing Sheets

(51) Int. Cl.
*C04B 41/52* (2006.01)
*E21D 11/38* (2006.01)
*C04B 111/00* (2006.01)

(56) References Cited

U.S. PATENT DOCUMENTS

| | | | |
|---|---|---|---|
| 3,892,442 A | 7/1975 | Janssen | |
| 4,046,357 A | 9/1977 | Twitchell | |
| 4,113,014 A | 9/1978 | Kubens | |
| 4,168,614 A | 9/1979 | Rieuz | |
| 4,237,182 A * | 12/1980 | Fulmer et al. | 428/305.5 |
| 4,475,847 A | 10/1984 | Cornely | |
| 4,522,986 A | 6/1985 | Short | |
| 4,583,784 A | 4/1986 | Uhri | |
| 4,705,814 A | 11/1987 | Grigsby | |
| 4,715,746 A | 12/1987 | Mann | |
| 4,738,989 A | 4/1988 | Smith | |
| 4,744,700 A | 5/1988 | Andy | |
| 4,748,192 A | 5/1988 | Smith | |
| 4,748,201 A | 5/1988 | Smith | |
| 4,792,262 A | 12/1988 | Kapps | |
| 4,795,764 A | 1/1989 | Alm | |
| 4,797,428 A | 1/1989 | Reichmann | |
| 4,847,026 A | 7/1989 | Jarboe | |
| 4,904,125 A | 2/1990 | Schmidt | |
| 5,130,191 A | 7/1992 | Pole | |
| 5,162,388 A | 11/1992 | Primeaux, II | |
| 5,166,183 A | 11/1992 | Franyutti | |
| 5,236,961 A | 8/1993 | Ho | |
| 5,284,880 A | 2/1994 | Harrison | |
| 5,317,076 A | 5/1994 | Primeaux, II | |
| 5,360,476 A | 11/1994 | Whatcott | |
| 5,368,769 A | 11/1994 | De Vos | |
| 5,389,693 A | 2/1995 | DeGenova | |
| 5,436,396 A | 7/1995 | Bailey | |
| 5,442,034 A | 8/1995 | Primeaux, II | |
| 5,480,955 A | 1/1996 | Primeaux, II | |
| 5,618,616 A | 4/1997 | Hume | |
| 5,693,682 A | 12/1997 | Kuczynski | |
| 5,716,711 A | 2/1998 | Calder | |
| 5,759,695 A | 6/1998 | Primeaux, II | |
| 5,837,363 A | 11/1998 | Colafati | |
| 5,962,144 A | 10/1999 | Primeaux, II | |
| 6,521,673 B1 * | 2/2003 | Brown | 521/130 |
| 6,617,032 B2 | 9/2003 | Rickner | |
| 6,664,414 B2 | 12/2003 | Tong | |
| 6,780,459 B2 | 8/2004 | Macpherson | |
| 6,797,789 B2 | 9/2004 | Davis | |
| 6,966,610 B2 | 11/2005 | Mills | |
| 7,011,865 B2 | 3/2006 | Sengupta | |
| 7,160,930 B2 | 1/2007 | Sparks | |
| 7,256,227 B2 | 8/2007 | Stone | |
| 7,290,960 B2 | 11/2007 | Sengupta | |
| 7,452,935 B2 | 11/2008 | Slone | |
| 7,687,147 B2 | 3/2010 | Helton | |
| 2002/0137871 A1 | 9/2002 | Wheeler | |
| 2004/0175559 A1 | 9/2004 | Hume | |
| 2005/0095066 A1 | 5/2005 | Warren | |
| 2006/0084708 A1 | 4/2006 | Schilling | |
| 2006/0240243 A1 | 10/2006 | Leslie | |
| 2007/0025821 A1 | 2/2007 | Ellenberger | |
| 2007/0129452 A1 | 6/2007 | Clatty | |
| 2007/0149656 A1 | 6/2007 | Rayner | |
| 2008/0097043 A1 | 4/2008 | Tong | |
| 2010/0011691 A1 | 1/2010 | Anaya | |
| 2010/0080920 A1 | 4/2010 | LaGrange | |

FOREIGN PATENT DOCUMENTS

| | | |
|---|---|---|
| CA | 2 301 208 | 9/2001 |
| CN | 1292307 | 4/2001 |
| CN | 2536875 | 2/2003 |
| CN | 1831068 | 9/2006 |
| CN | 2818982 | 9/2006 |
| CN | 10043457 | 6/2008 |
| DE | 32 02 048 | 7/1983 |
| DE | 32 29 507 | 2/1984 |
| DE | 102008025091 | 10/2012 |
| EP | 0 543 412 | 5/1993 |
| EP | 0 819 715 | 1/1998 |
| EP | 1 038 897 | 9/2000 |
| EP | 1 167 414 | 1/2002 |
| FR | 1 583 561 | 11/1969 |
| FR | 2 061 248 | 6/1971 |
| JP | 08-012402 A | 1/1996 |
| JP | 11-235899 A | 8/1999 |
| KR | 10-2008-0113435 | 12/2008 |
| KR | 876225 B1 | 12/2009 |
| WO | 02/0102871 | 12/2002 |
| WO | 2009/131935 | 10/2009 |
| WO | 2010/0034109 | 4/2010 |

OTHER PUBLICATIONS

Archibald, "Comparison of Reinforcement Benefits of Spray-on Linings in Side-by-Side Unconfined Compression Failure Tests on Rock", http://www-eng.lbl~lafever/CUORE/Cuore-lngs/Radon/rockguard.pdf (May 2001).

Bernard, "Release of New ASTM Round Panel Test", (Spring 2003) http://ww.shotcrete.org/pdf_files /Spr03.Bernard.pdf.

Broekaert, "Polyurea spray coatings The technology and latest developments" Http://www.huntsman.com/performance_products/Media/Polyurea_Spray_Coatings_The_technoloy_and_latest_developments.pdf (2002).

Custom Linings® SSGS Sprayable Ground Support System, Custom Linings Mining Support Systems, p. 1 of 2.

Gunite Equipment/Shotcrete Equipment http://gunitesupply.com retrieved from web Mar. 29, 2010.

Landrock, *Handbook of Plastic Foams* RSBN 0 8155 1367 7 1995 Noyes Publications, p. 65.

Lau, "Laboratory Investigation of Support Mechanism for Thin Spray-on Liners", *The 12th International Conference of International Association for Computer Methods and Advances in Geomechanics (IACMAG)* Oct. 1-6, 2008.

Northcroft, "Innovative materials and methods for ground support, consolidation and water sealing for the mining industry", *Journal of South African Institute of Mining and Metallurgy* (2006) vol. 106, No. 12, pp. 835-843.

Polyurethane Grouting MICON & RokLok™ http://www.miconmining.com/polyurethane%20grouting.html 2005, retrieved from web Apr. 26, 2010.

MEYCO® TSL 865 Product Data BASF The Chemical Company, www.masterbuilders.com www.meyco.basf.corn 2009.

Spearing, et al., "The performance and potential for reactive thin support membranes in underground applications" *Rock Mechanics—Challenge for Society*, Sarkka & Eloranta (eds) 2001 Swets & Zeitlinger Lisse, ISBN 90 2651 821 8, pp. 389-391.

"Spray Polyurethane Foam Roofing Systems" Kohls Foam Systems http://www.kohlsfoamsystems.com/spf-roofing.shtml retrieved from the web on Mar. 9, 2010.

Yilmaz, "Shear-bond strength testing of thin spray-on liners" *The Journal of the Southern African Institue of Minin and Metalurgy*, vol. 107, Aug. 2007.

ATSM-D624-00(2007) Standard Test Method for Tear Strength of Conventional Vulcanized Rubber and Thermoplastic Elastomers.

ASTM-D412-062A$^{e2}$ Standard Test Methods for Vulcanized Rubber and Thermoplastic Elastomers—Tension (2008).

* cited by examiner

METHOD OF REINFORCING IRREGULAR STRUCTURES

CROSS REFERENCE TO RELATED APPLICATION

This application is a national stage filing under 35 U.S.C. 371 of PCT/US2011/035870, filed May 10, 2011, which claims priority to U.S. Patent Application No. 61/333,829, filed May 12, 2010, the disclosures of which are incorporated by reference in their entirety herein.

FIELD OF DISCLOSURE

This disclosure relates to a method of providing a reinforcing coating for reinforcing irregular rock or concrete structures.

BACKGROUND

A variety of reinforcing schemes have been used historically to reinforce irregular rock structures, and particularly those irregular rock structures encountered in mining operations. Common strategies have included the use of wooden boards to reinforce earthen tunnels, or installing an assembly of bolts and wire mesh and/or applying cement on the exposed surfaces of an excavation. More recently, various polymeric materials have come into use as reinforcing coatings.

U.S. Pat. No. 4,046,357 describes an apparatus and method for the application of a fast drying, pumpable cement to the walls and ceilings of mine tunnels and shafts. However, there are several limitations related to using cementitious technology, including the large equipment required for mixing and dispensing, messy application and the resulting time and effort related to cleaning up after application, and drying time required (from 15 minutes to over four hours, depending on the coating and atmospheric conditions). In confined regions of mines having ceiling heights of no more than 4 to 5 meters, or even 1.2 to 1.5 meters, it may be preferable to use smaller, lighter weight resin-dispensing systems. Another disadvantage of using cement for reinforcement is the low elongation or ability to respond to rock movement.

U.S. Pat. No. 4,715,746 describes a method of strengthening geological formations in underground workings or mines by introducing mixtures that form polyurethanes, typically by introducing polyisocyanate and polyol components into holes bored for the purpose.

U.S. Pat. Nos. 4,738,989, 4,748,192, and 4,748,201 disclose aliphatic polyurethane compositions, including sprayable, fast-curing compositions.

U.S. Pat. No. 5,716,711 discloses a two layer structure for coating surfaces for providing a gas-tight, flexible fire retardant coating onto a concrete, masonry or rock surface which structure includes a layer of solvent-free, elastomeric unfoamed polyurethane having a tensile strength sufficient to prevent localized gravity falls of loose rock, concrete or masonry, and a layer of vermiculite bonded onto the polyurethane.

U.S. Pat. No. 6,780,459 discloses methods for stabilizing irregular structures such as rock structures in mines by providing a weather resistant and anti-corrosive polyurea coating.

U.S. Pat. No. 6,966,610 discloses a method for providing a protective coating in a mine comprising spraying onto the rock surfaces of the mine a hot melt adhesive in an amount to form a coating at least 1 mm thick and allowing the coating to solidify, thereby to provide a protective coating on the at least one rock surface of the mine.

U.S. Pat. No. 7,011,865, which is incorporated herein by reference, discloses an elastomeric polymeric film that can be used as a load-bearable coating, for example, to assist in protecting from rock bursts in a mine.

SUMMARY

In an embodiment, the disclosure includes a method for reinforcing irregular rock, combining a polyurethane foam layer and a reinforcing polyurea layer to provide a composite reinforcement strategy that has advantages over using either a polyurethane foam layer or a reinforcing polyurea layer separately. The polyurethane foam layer may fill existing voids in the irregular rock, and further may provide the advantage of reducing water leakage or gas leakage where there are cracks or other voids in the irregular rock. The reinforcing polyurea layer, when applied over the polyurethane foam layer, can more effectively bridge cracks or other voids in the irregular rock, resulting in a stronger reinforcement than if the reinforcing polyurea coat was used alone. Each of the layers may be formed by spray application of curable compositions. The polyurethane foam layer may be sprayed onto the irregular rock as a curable foam composition that expands during curing to fill in irregularities. The polyurea reinforcing layer may be sprayed as a curable reinforcing composition to form an additional, reinforcing layer over the polyurethane foam.

In an embodiment of the current method, the surface to be coated comprises a portion of a mine. In an embodiment, the mine may be a mine dug into the side of a hill or mountain. In some embodiments, the mine is an underground mine, as opposed to, for example, a mine dug into the side of a hill. In some embodiments, the portion of a mine may include a wall, a ceiling, a face and combinations thereof.

In some embodiments, the curable foam composition may comprise water as a blowing agent, typically in an amount of about 0.5% by wt. to about 5% by wt. of the curable foam composition, prior to application.

In some embodiments, at least partially curing the curable foam composition may include heating the curable foam composition to a temperature in the range of from about 90° C. to about 115° C. In some embodiments, heating the curable foam composition may include heating by an exothermic reaction of the mixture of components in the curable foam composition, as opposed to the addition or application of an external source of heat.

In some embodiments, the foam layer may be self-skinning, or in other words may form an integral skin. The integral skin may advantageously provide a barrier to release of gas bubbles during the application of the curable reinforcing composition, which may be the result of an exothermic reaction. The integral skin may form at least on the surface of the foam layer that is spaced from the surface being coated, and typically forms prior to the application of the curable reinforcing composition onto the integral skin on the surface of the foam layer.

In some embodiments it may be advantageous to include various additives in the curable foam composition and/or the curable reinforcing composition. In some embodiments it may be useful to include agents which enhance the escape of gas bubbles formed during exothermic reaction of the curable reinforcing composition, which may result in a stronger reinforcement of irregular structures. In some embodiments it may be useful to include flame retardants in the curable foam composition and/or the curable reinforcing composition.

In another aspect, the current disclosure includes a surface coated using the method of any of the preceding claims.

In another aspect, the current disclosure includes a composite comprising: (a) a surface; (b) a foam layer adhered to at least a portion of the surface; and, (c) a reinforcing layer adhered to at least a portion of the foam layer; wherein the surface is a portion of a mine selected from the group consisting of a wall, a ceiling, a face and combinations thereof; wherein the foam layer comprises a polyurethane; and wherein the reinforcing layer comprises a polyurea.

In some embodiments, the current description includes a mine that has a surface that has been coated according to the method of the present description, wherein the surface is any of a wall, a ceiling, or a face.

GLOSSARY

As used herein, the term "adhered", as applied to layers of a composite or other surface, broadly refers to the adhesion of a first layer to a second layer or other surface either with or without an adhesive, a tie layer or any other layer between the first layer and the second layer or other surface, and may include having a semi- or full-interpenetrating network involving a portion of the first layer and a portion of the second layer or other surface, and may also include having a bond between the first layer and the second layer or other surface.

As used herein, the term "adjacent" refers to layers which are in proximity with one another—having three or less layers between them.

As used herein, the term "back" may refer to a mine back, that is, a ceiling portion of a mine.

As used herein, the term "cream time" refers to the time from the combination of isocyanate and polyol components of a curable foam composition until the foam mixture begins to rise.

As used herein, the term "face" may refer to a mine face, that is, a surface where the mining work is advancing.

As used herein, the term "integral skin" means a distinct, higher density foam layer that is formed from the same material as the foam and is an integral part thereof.

As used herein, the term "irregular surface" may include a non-planar surface. In some instances, an irregular surface may include a planar or substantially planar surface and one or more non-planar elements that are disposed on or in the planar surface. Some or all of the non-planar elements may extend into, or below, the planar surface. Some or all of the non-planar elements may extend above the planar surface. In some instances, the irregular surface may include rock surfaces exposed during mining operations, for example.

As used herein, the term "isocyanate index" is the quotient of the number of isocyanate groups in a reaction mixture divided by the number of isocyanate reactive groups present in the reaction mixture, multiplied by 100, water counting as a difunctional compound.

As used herein, the term "polyurea" may include polymeric compounds that have both urea and urethane linkages.

As used herein, the term "rise time" refers to the time from the combination of isocyanate and polyol components of a curable foam composition until the foam mixture stops rising.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers.

As used in this specification and the appended claims, the term "or" is generally employed in its sense including "and/or" unless the content clearly dictates otherwise. The term "polymer" will be understood to include polymers, copolymers (e.g., polymers formed using two or more different monomers), oligomers and combinations thereof, as well as polymers, oligomers, or copolymers that can be formed in a miscible blend.

Figure 1A:
FIG. 1A shows an assembly of rocks prior to coating with a composite reinforcing coating of the current description.
Figure 1B:
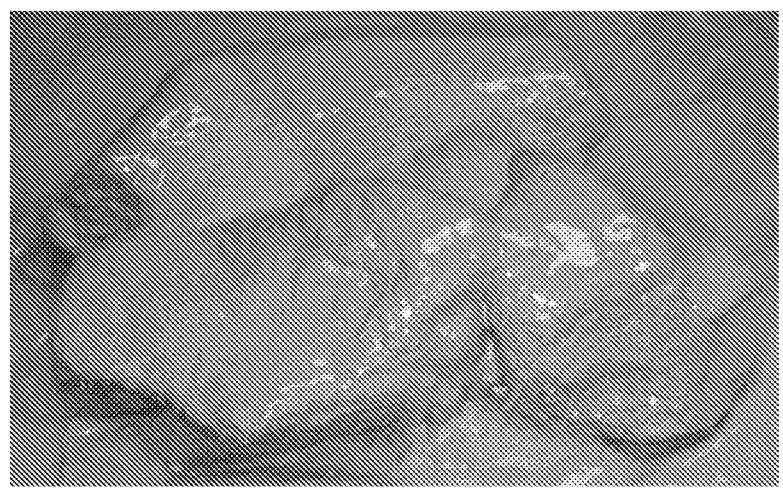
FIG. 1B shows an assembly of rocks after coating with a composite reinforcing coating of the current description.

FIG. 1A shows three ordinary rocks assembled together, the assembly having an overall dimension of about 35 centimeters wide by 50 cm long, and it can be seen that there are various gaps and hollows between the rocks. FIG. 1B shows the same group of rocks, but coated with a composite reinforcing coating of the current description, which includes a foam layer (not shown) that is coated on at least a portion of the rocks, and a reinforcing layer that is coated on at least a portion of the foam layer. It will be understood that the foam layer also fills in, at least partially, the various gaps and hollows between the rocks, providing a surface of the foam layer upon which the reinforcing layer may adhere and bridge. The resulting reinforcing coating bridges from rock to rock and holds the assembly of rocks together.

In an embodiment, the disclosure includes a method for reinforcing a surface, and more particularly an irregular surface, wherein the irregular surface is selected from the group consisting of irregular rock and irregular concrete and combinations thereof; applying a curable foam composition onto at least a portion of the surface, wherein the curable foam composition comprises a mixture of a foam composition polyisocyanate component and a foam composition polyol component; at least partially curing the curable foam composition to form a foam layer, wherein at least a portion of the foam layer is adhered to the surface; applying a curable reinforcing composition onto at least a portion of the foam layer, wherein the curable reinforcing composition comprises a mixture of a reinforcing composition polyisocyanate component, which may include quasi-prepolymers, and a reinforcing composition polyamine component; and at least partially curing the curable reinforcing composition to form a reinforcing layer, wherein at least a portion of the reinforcing layer is adhered to the foam layer. This method may be referred as a "composite approach" to reinforcing a surface.

A surface of the current description may include any irregular surfaces where the compositions of the current description may be applied. The compositions and methods of the current description may be useful for infrastructure applications such as above ground bridge support, cement pillar reinforcement and the like, below ground sewer pipe crack management, waste water return pipes and the like. In some embodiments, the irregular surface may include, as non-limiting examples, surfaces in any of a variety of excavations, trenches, wells, building foundation sites, tunnels for transportation systems, and mines, including open pit mines, underground mines, mines dug into the side of a hill or mountain, and deep underground mines. In some embodiments, a surface of the current description may include the various surfaces in a mine, including walls, ceilings or faces that either occur naturally or are man-made, resulting from digging, scraping, drilling, boring, hammering, blasting, or other technologies known to be useful for excavating mines. In mines, it is typical to refer to the various exposed surfaces as walls, ceilings (which may alternatively be referred to as backs), or faces. The materials at the exposed surfaces in a mine typically may include, as non-limiting examples, rocks, sand, coal, salt, chalk, or soil, for example. In some excavations, additional materials may have been applied to portions of the exposed surface, including, for example, pumpable cement. Some mine walls, ceilings (backs) and faces may have a tendency towards shifting, crumbling, spalling, collapsing, seeping, oozing, releasing flammable vapors (including methane gas, the release of which may occur in coal mining, for example), or other potential modes of failing. A method of applying a reinforcing coating of the current description may be useful in stabilizing and protecting the walls, ceilings and faces commonly found in mines.

In some embodiments, the surface of the current description may have a substantially smooth surface in some regions. In some embodiments, the surface of the current description may include surface irregularities, including, for example, gaps, cracks, holes, or other surface irregularities that may be regions where a conventional coating such as a thin spray-on liner may begin to fail by cracking, tearing, pulling away from the surface, and the like, possibly due to lack of continuous coverage over the surface irregularities. In some instances, the gaps, cracks, holes, wedges, crevices or other surface irregularities may be sufficiently large that a thin spray-on liner alone will not be sufficient to bridge across the surface irregularities without the addition of a filling layer applied to at least partially fill in the gaps, cracks, holes, wedges, crevices or other surface irregularities. The current description includes steps of applying a curable foam composition to the surface, and at least partially curing the curable foam composition to form a foam layer, of which at least a portion is adhered to the surface. The foam layer so formed may improve the effectiveness of reinforcing coatings by at least partially filling in the gaps, cracks, holes or other irregularities in the surface, thereby providing a surface for the steps of applying a curable reinforcing composition onto the foam layer, and curing the curable reinforcing composition to form a reinforcing layer, wherein at least a portion of the reinforcing layer is adhered to the foam layer. This method of forming a composite coating of a foam layer on an irregular surface in combination with applying a reinforcing layer onto the foam layer may result in superior reinforcing characteristics when compared with conventional thin spray-on liner methods that lack this use of a foam layer. In particularly demanding applications, such as mining operations where explosives are used, it may be beneficial to combine the reinforcing methods of the current description with supplementary measures, including for example the use of rock bolts, as is common practice in hard rock mines, for example, where rock bolts are commonly used for joining layers of rock together whether or not other types of ground support are used.

Curable Foam Composition

Curable foam compositions useful in the current description may include compositions known to be useful in the formation of polyurethane foams. Curable foam compositions may include water blown foams that do not require the use of additional blowing agents, thereby avoiding the need for potentially flammable blowing agents, although additional blowing agents may be used. The curable foam compositions of the description may have a cream time of about 3 seconds to 5 seconds.

In some embodiments, the curable foam composition may be applied by spraying a layer of at least about 0.5 mm, or typically at least about 1 mm thickness to the surface, and the curable foam composition may expand by about 4 to 8 times its volume when applied. The curable foam composition may penetrate cracks, pores, or other openings in the surface prior to completing expansion. In a typical embodiment, the curable foam composition may undergo an exothermic reaction to generate temperatures in the range of from about 90° C. to about 115° C., and at these temperatures the curable foam composition may become a foam layer having a density of about 2.5 to 9 lbs./cu. ft. (pounds per cubic foot; about 40 to 144 kg/m$^3$). In some embodiments, the foam layer may have an integral skin layer formed on a surface of the foam layer. The position of the integral skin on the foam layer is such that, when the foam layer is adhered to a surface, at least a part of the skin will face generally towards the direction from which the curable reinforcing composition will be applied. In some embodiments, the foam layer may have a closed cell structure.

In an embodiment, a curable foam composition of the description may include a two-part composition comprising a curable foam polyisocyanate component ($A_{FC}$) and a curable foam polyol component ($B_{FC}$).

The curable foam polyisocyanate component $A_{FC}$ used in the method according to the current description may be based on polyphenylene-polymethylene polyisocyanates such as those obtainable by aniline/formaldehyde condensation followed by phosgenation ("polymeric MDI") or derivatives of these polyisocyanates which contain carbodiimide, biuret, urethane and/or allophanate groups and are liquid at room temperature. Polyisocyanate mixtures which are liquid at room temperature and have been obtained by the phosgenation of aniline/formaldehyde condensates ("polymeric MDI") and their liquid, isocyanate-containing reaction products with sub-equivalent quantities (NCO/OH molar ratio=1: 0.005 to 1:0.3) of polyvalent alcohols within the molecular weight range of 62 to about 3,000, typically within the molecular weight range of about 106 to 3,000, or more typically within the molecular weight range of about 250 to 750, and typically containing ether groups. Mixtures of 2,4'- and 4,4'-diisocyanatodiphenyl methane which are liquid at room temperature are also suitable for use as polyisocyanate component $A_{FC}$. In principle, other organic polyisocyanates could also be used according to the current description, including polyisocyanate mixtures of the diphenyl methane series having a viscosity at 25° C. of about 50 to 1200 mPa, an isocyanate content of from about 15% by weight up to about 32% by weight, having an isocyanate functionality of about 2.0 to 2.7. Suitable commercially available polyisocyanates useful in the current description may include, for example, PM 200, available from Yantai Wanhua Polyurethanes Co. Ltd (Yantai, P. R. China) under the tradename WANNATE PM-200.

In some embodiments, polyol component $B_{FC}$ may be based on mixtures of (i) organic polyhydroxyl compounds having an OH number of about 100 to 800, or typically about 200 to 700, and (ii) monovalent alcohols.

The polyhydroxyl compounds (i) may include polyether polyols or mixtures of such polyether polyols known from polyurethane chemistry. When mixtures of various polyhydroxyl compounds are used, the particulars given above concerning the hydroxyl number apply to the mixture as a whole. This means that individual components of a mixture may have hydroxyl numbers outside the given range. Suitable polyether polyols may include, for example, the propoxylation products of 2- to 8-valent starter molecules such as, for example, water, 1,2-dihydroxy propane, trimethylol propane, pentaerythritol, glycerol, sorbitol, ethylene diamine and optionally cane sugar. Component (i) typically has an average hydroxyl functionality of about 2.5 to 5.0, or more typically about 2.0 to 4.5. Suitable mixtures of this kind may be obtained, for example, by subjecting mixtures of starter molecules of the type mentioned above as examples to a propoxylation reaction. Alternatively, polyhydroxyl polyethers which have been prepared separately may subsequently be mixed together to form component (i) according to the current description.

In some embodiments, component (ii) is based on monovalent alcohols having a molecular weight range of 32 to about 600, typically about 60 to 150, containing a primary, secondary or tertiary hydroxyl group. Component (ii) may also be based on mixtures of various monovalent alcohols. With mixtures, the particulars given concerning the molecular weights are based on the statistical average values. Examples of suitable monovalent alcohols include methanol, ethanol, n-propanol, isopropanol, n-butanol, isobutanol, t-butanol, n-pentanol, 1-methyl-1-hydroxy-butane, n-hexanol, 2-methyl-1-hydroxypentane, 2-ethyl-1-hydroxy-hexane, n-dodecanol, n-octadecanol, commercial fatty alcohols or mixtures thereof containing up to about 40 carbon atoms, cyclohexanol and benzyl alcohol. Component $B_{FC}$ may contains the monovalent alcohols (ii) in a quantity of about 0.01 to 20% by weight, typically about 0.1 to 5% by weight, based on the total weight of component $B_{FC}$.

The following are non-limiting examples of suitable auxiliary agents and additives (C) which may optionally be used:

(C1) A blowing agent may be added. Water may be added as blowing agent in a quantity of about 0.5% by weight to about 5% by weight, based on the weight of component $B_{FC}$. Organic blowing agents known in the art may also be used.

(C2) Catalysts for the isocyanate addition reaction may include those known in the art, and may include, for example, organic tin compounds such as tin(II) octoate or dibutyl tin dilaurate or tertiary amines such as N,N-dimethyl benzylamine or triethylene diamine. These catalysts may be used in a range of about 0.3 to 3% by weight, based on the total quantity of curable foam composition.

(C3) Foam regulators such as the polyether polysiloxanes known for this purpose.

(C4) Blowing catalysts such as DABCO BL-17, DABCO BL-19, and POLYCAT 41, each available from AirProducts (Allentown, Pa.), and the like.

(C5) Chain extenders such as 1,4-butanediol or 1,3-propanediol. Chain extenders are reactive low molecular weight di-functional compounds such as hydroxylamines, glycols or diamines and are used to influence the end properties of the foam layer.

(C6) Carbonates, typically chosen from the group of ethylene carbonate, propylene carbonate, butylene carbonate and dimethyl carbonate.

Other auxiliary agents and additives which may be used include flame retardants known to those skilled in the art (e.g. phosphoric acid derivatives, expandable graphite, and the like), and organic or inorganic fillers (e.g. urea, calcium carbonate, mica or talcum).

In some embodiments, the individual components of the curable foam composition are present in such quantities that they correspond to an isocyanate index of about 90 to 150, or typically about 120 to 140.

In preparing the curable foam composition, auxiliary agents and additives (C) used are generally mixed with polyol component $B_{FC}$ before applying, and the reaction mixture is then prepared as a 2-component mixture. This means that the reaction mixture is prepared by vigorously mixing polyisocyanate component $A_{FC}$ with polyol component $B_{FC}$ or with the mixture of polyol component $B_{FC}$ and auxiliary agents and additives (C). Mixing apparatus known in the art may be used for this purpose.

In some embodiments, the curable foam composition may be a sprayable methylene diphenyl diisocyanate (MDI) polyurethane water-blown closed cell skin foam with a density (after curing) of about 2.5 to 9 lbs./cu. ft. (about 40 to 144 kg/m$^3$).

In some embodiments, the curable foam composition may exhibit a cream time in the range of about 2 seconds to about 5 seconds.

In some embodiments, the curable foam composition may exhibit an exotherm having a temperature in the range of about 100° C. to about 115° C. The exotherm may occur as a result of the reaction of components within the curable foam composition during the applying step. The heat generated by the exotherm may aid in the formation of an integral skin on the surface of the foam layer.

In some embodiments, the curable foam composition may exhibit a foam rise of about 700%.

Curable Reinforcing Composition

In some embodiments, the current description includes applying a curable reinforcing composition to form a reinforcing layer, typically a polyurea layer, which may include urethane linkages. While the reinforcing layer may be the top layer in the current method, it need not be the exposed or outermost layer; it need only be outside the foam layer, relative to the surface. In some embodiments, the reinforcing layer may be adjacent to the foam layer. Typically, the curable reinforcing composition may be applied onto at least a portion of the foam layer. As shown in the examples, a reinforcing layer of the current description may have a Tensile Strength value of at least 20 MPa when tested according to ASTM D412-06ae2, a Percent Elongation value of at least 200 when tested according to ASTM D412-06ae2, and a Tear Strength value of at least 122 kilonewtons per meter (kN/m) when tested according to ASTM D624-00 (2007). A Tensile Strength value for a reinforcing layer of the current description may be as high as 30 MPa, 40 MPa, or even 60 MPa. A Percent Elongation value for a reinforcing layer of the current description may be as high 260, 300, or even 350. A Tear Strength value for a reinforcing layer of the current description may be as high as 105 kN/m, or even 175 kN/m.

The curable reinforcing composition of the present description typically includes an isocyanate component ($A_{RC}$) and an amine component ($B_{RC}$). Reaction of the $A_{RC}$ and $B_{RC}$ components may occur during the mixing and application of the curable reinforcing composition onto the foam layer, to form a polyurea reinforcing layer on the foam layer. The isocyanate component $A_{RC}$ may be an aliphatic isocyanate or an aromatic isocyanate, but is more typically an aromatic isocyanate or an aliphatic/aromatic isocyanate. Non-limiting examples of suitable aromatic polyisocyanates may include m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; diphenylene 4,4'-diisocyanate and the like. Non-limiting examples of suitable aliphatic/aromatic diisocyanates may include xylylene-1,3-diisocyanate; bis(4-isocyanatophenyl) methane; bis(3-methyl-4-isocyanatophenyl)methane; and 4,4'-diphenylpropane diisocyanate. These isocyanates may be used individually or in combination.

In some embodiments of the curable reinforcing composition, the isocyanate component may be at least partially reacted with an active hydrogen-containing material to form a quasi-prepolymer, although this is not an absolute requirement. A non-limiting example of a quasi-prepolymer isocyanate comprises methylene diphenyl diisocyanate (MDI) and a polytetramethyleneetherglycol (PTMEG), which may have an isocyanate number in the range of 15-16%. Suitable commercially available non-limiting examples of PTMEG polyols includes TERATHANE 250, TERATHANE 1000, and TERATHANE 2000, available from Invista (Wilmington, Del.). Suitable commercially available non-limiting examples of quasi-prepolymers may include, for example, BAYTEC ME-120 or ME-230, available from Bayer (Pittsburgh, Pa.); CONATHANE RN-1513 or RN-1526, available from Cytec Industries (Olean, N.Y.), and QZ-E-16 or QZ-E-181 available from ITWC Inc. (Malcolm, Iowa).

In some embodiments, aliphatic isocyanates may be useful to include. Suitable aliphatic isocyanates may be of the type described in U.S. Pat. Nos. 4,748,192 and 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3,5-trimethyl-5-isocyanatomethyl-cyclohexane (isophorone diisocyanate); 4,4',2,2'- and 2,4'-dicyclohexyl-methane diisocyanate, as well as the corresponding isomer mixtures, and the like.

In some embodiments, the active hydrogen-containing materials may include, but are not necessarily limited to, polyols, high molecular weight polyoxyalkyleneamine, also described herein as amine-terminated polyethers, or a combination thereof.

In some embodiments of the curable reinforcing composition, polyols may include polyether polyols, polyester diols, triols, tetrols, having an equivalent weight of at least about 500, and typically at least about 1,000, up to about 3,000. Polyether polyols based on trihydric initiators of about 4,000 molecular weight and above are especially useful. The polyethers may be prepared from ethylene oxide, propylene oxide, butylene oxide or mixtures of propylene oxide, butylene oxide and/or ethylene oxide. Other high molecular weight polyols which may be useful include polyesters of hydroxyl-terminated rubbers, e.g., hydroxyl-terminated polybutadiene, as well as hydroxyl-terminated quasi-prepolymers of polyols and isocyanates.

In some embodiments of the curable reinforcing composition, the active hydrogen-containing materials include amine-terminated polyether polyols, including primary and secondary amine-terminated polyether polyols of greater than 1,500 average molecular weight having from about 2 to about 6 functionality, or from about 2 to about 3 functionality, and an amine equivalent weight of from about 750 to about 4,000. Mixtures of amine-terminated polyethers may be used. In some embodiments, the amine-terminated polyethers have an average molecular weight of at least about 2,500. These materials may be made by various methods known in the art.

In some embodiments of the curable reinforcing composition, useful amine-terminated polyether resins may include polyether resins made from an appropriate initiator to which lower alkylene oxides, such as ethylene oxide, propylene oxide, butylene oxide or mixtures thereof, are added with the resulting hydroxyl-terminated polyol then being aminated. When two or more oxides are used, they may be present as random mixtures or as blocks of one or the other polyether. In the amination step, it is desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. The amine-terminated polyether resins useful in this invention may have greater than 50 percent of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which are incorporated herein by reference.

In some embodiments of the curable reinforcing composition, a single high molecular weight amine-terminated polyol may be used. Also, mixtures of high molecular weight amine-terminated polyols, such as mixtures of di- and trifunctional materials and/or different molecular weight or different chemical composition materials, may be used. High molecular weight amine-terminated polyethers or simply polyether amines may also be used alone or in combination with the aforestated polyols. The term "high molecular weight" is intended to include polyether amines having a molecular weight of at least about 2000, including, for example, the JEFFAMINE® series of polyether amines available from Huntsman Petrochemical Corporation; they include JEFFAMINE D-2000, JEFFAMINE D-4000, JEFFAMINE T-3000 and JEFFAMINE T-5000.

In some embodiments, the curable reinforcing composition may include an organic alkylene carbonate, as defined in U.S. Pat. No. 5,442,034, incorporated herein by reference. As noted therein, in a particular embodiment of the invention, the alkylene carbonates are typically chosen from the group of ethylene carbonate, propylene carbonate, butylene carbonate and dimethyl carbonate.

In one embodiment of the curable reinforcing composition, the proportion of alkylene carbonate in the $A_{RC}$ component ranges from about 1 to about 10 percent (these percentages are based on 100 volume parts in the $A_{RC}$ component). The use of an alkylene carbonate additive may reduce the viscosity of the system, particularly the $A_{RC}$ component it resides in prior to mixing. An alkylene carbonate may also allow slower effective reactivities in spray polyurea elastomer systems, improved properties and surface characteristics (flowability) and improved adhesion to the surfaces on which the elastomer is sprayed.

In some embodiments, the $B_{RC}$ component of the curable reinforcing composition may include aliphatic amines and aromatic amines. In an embodiment, a useful mixture of amines may be a blend of about 25% by wt. aromatic amines and 75% by wt. aliphatic amines. Suitable amines may include diethyltoluenediamine, di-(methylthio)toluenediamine, and polyetheramines available as JEFFAMINE D-2000 (Huntsman Corp).

In some embodiments, the curable reinforcing composition may also include amine-terminated chain extenders in the formulation, which may typically be placed within the $B_{RC}$ component. Non-limiting examples of chain extenders may include those aliphatic and cycloaliphatic diamine chain extenders mentioned in U.S. Pat. Nos. 5,162,388 and 5,480,955, incorporated herein by reference. Aromatic diamine chain extenders may also be useful, such as those described in U.S. Pat. No. 5,317,076, incorporated herein by reference. In one embodiment of the curable reinforcing composition, aromatic chain extenders may be used. The amount of amine-terminated chain extender in the total spray polyurea elastomer system may range from about 10 pbw to about 22.5 pbw (parts by weight), or from about 10 pbw to about 20 pbw; or from about 12.5 pbw to about 20 pbw. Suitable examples of commercially available amine extenders include: ETHACURE 100, ETHACURE 300, and ETHACURE 420 from Albemarle Corp. (Baton Rouge, La.); CLEARLINK 1000 from Dorf Ketal (Stafford, Tex.); JEFFLINK 754 from Huntsman Petrochemical Corporation (The Woodlands, Tex.); and BAXXODUR PVC 136 from BASF (Florham Park, N.J.).

Other Curable Reinforcing Composition Additives

In some embodiments of the curable reinforcing composition it may be beneficial to include additives as flow agents and de-aeration agents to assist with flow and leveling of the applied coating, including for example acrylics, siloxanes, the MODAFLOW, ADDITOL, and MULTIFLOW acrylic copolymer flow and leveling additives available from Cytec (Woodland Park, N.J.), and the X20 combination product available from The Hanson Group, LLC (Duluth, Ga.). It may be beneficial in some instances to minimize entrapment of gas bubbles that may interfere with adhesion of the curable reinforcement composition to the foam layer, or otherwise compromise the strength of the reinforcement layer. In embodiments where the formulation of the curable reinforcing composition contains little or no water, the additives may need to be selected based on their ability to function in the absence of water, and their ability to work within relatively short gel time of the curable reinforcing composition.

Pigments or pigment dispersions, for example titanium dioxide, may be incorporated in the curable reinforcing composition to impart color properties. Pigments may be pre-dispersed in an amine, and typically, pigments are added with the $B_{RC}$ component.

Useful flame retardants additives may include: metal hydroxides, antimony compounds, boron compounds, phosphorus compounds, halogenated organic flame retardants, organophosphorus flame retardants, nitrogen based flame retardants, intumescent types (graphite). For non-liquid, particulate flame retardants, including some forms of graphite, it may be beneficial to enhance suspension of the particulate flame retardant material with additives that may include anti-settling agents known in the art, such as TEXAPHOR SPECIAL, which is a highly concentrated solution of surface-active anionic components available from Cognis (Bristol, Pa.), or to add suspending agents such as the THIXATROL materials described in U.S. Pat. Appl. 2010/0080920. In some applications it may be desirable for the reinforcement layer to meet or exceed Surface Burning test standards such as ASTM E-84 and CAN/ULC S-102.

In some embodiments of the curable reinforcing composition, useful reinforcing materials known to those skilled in the art may be added. For example, chopped or milled glass fibers, chopped or milled carbon fibers and/or mineral fibers. Examples of useful reinforcing fibers may include para-aramid fibers of the TWARON (Teijin Aramid, Emmen, Netherlands) or KEVLAR (DuPont, Wilmington, Del.) type.

Composite Coating

The current description includes a method of applying a composite coating, where the applied composite coating includes a foam layer adhered to at least a portion of a surface, where the surface is typically a surface in a mine, and where the foam includes a polyurethane of the current description, and the composite further a reinforcing layer adhered to at least a portion of the foam layer, where the reinforcing layer includes a polyurea of the current description, which in some embodiments may have a Tensile Strength value of at least 20 MPa when tested according to ASTM D412-06ae2, a Percent Elongation value of at least 200 when tested according to ASTM D412-06ae2, and a Tear Resistance value of at least 122 kilonewtons per meter when tested according to ASTM D624-00 (2007), or combinations of these properties, as shown in the examples.

Methods of Applying

In some embodiments, applying the curable reinforcing composition comprises spraying. However, other means of applying, including brush-applying, may also be useful in some instances. Typically, the curable polyurethane foam composition is applied to the surface first, and at least partially cured to form a foam layer, and then the curable topcoat composition is applied over the first layer. In some embodiments, the curable reinforcing composition may be sprayed onto the foam layer after waiting for at least about 30 seconds after the curable polyurethane foam layer is applied, which may allow the foam to rise and the skin to begin to set firmly.

Typically, coating two walls and the "back" in a mine with a roughly 25-50% overlap of the spray pattern for a 4 meter by 4 meter opening in a mine may require sufficient time for an exothermic curing of the curable foam composition prior to application of the curable reinforcing composition.

It may be beneficial, in some instances, to subject the surface to a cleaning operation prior to application of the curable foam composition. A suitable cleaning operation may include high pressure water blasting (scaling) of the surface to remove, for example, dust, particulates and loose rock.

While the curable foam composition may be applied to a dry surface, the surface may also have moisture on the surface, as may be the case in some underground mines, for example.

Suitable application equipment may include a feed system, for example, stick type drum pumps having feed pressure capabilities of 200 to 500 psi, as may be obtained with GRACO T2 or Monarch Drum Pumps; a spray system, including for example a GRACO Gusmer H20/35 or GRACOReactor Series H-40 or H-50 spray system; an impingement type gun having a delivery rate capability of about 2.5 to 8 liters per minute; and optionally drum heaters to heat $A_{RC}$ and $B_{RC}$ when ambient temperatures are low or when supplemental heating is desired.

Typical parameters for spraying the curable foam composition of the current description may include a preheat and hose temperature of about 50° C. to about 70° C., at a delivery pressure of about 1200 psi, although other temperatures and delivery pressures may also be used.

Typical parameters for spraying a curable reinforcing composition of the current description may include a preheat and hose temperature of about 70° C. to about 80° C., at a delivery pressure of about 2100 psi, although other temperatures and delivery pressures may also be used.

Objects and advantages of the current description are further illustrated by the following examples, but the particular materials and amounts thereof recited in these examples, as well as other conditions and details, should not be construed to unduly limit this description.

EXAMPLES

Test Methods

Tensile strength data reported below was measured at room temperature at the indicated times, according to ASTM D412-06ae2, using Die C.

Elongation data reported below was measured at room temperature at the indicated times, according to ASTM D412-06ae2, using Die C.

Tear strength data reported below was measured at room temperature at the indicated times, according to ASTM D624-00 (2007), using Die C, unless indicated otherwise.

Hardness data reported below was measured according to ASTM D2240-05.

Gel tack time data and tack free time data reported below were measured according to ASTM D 7487-08.

Figure 2:
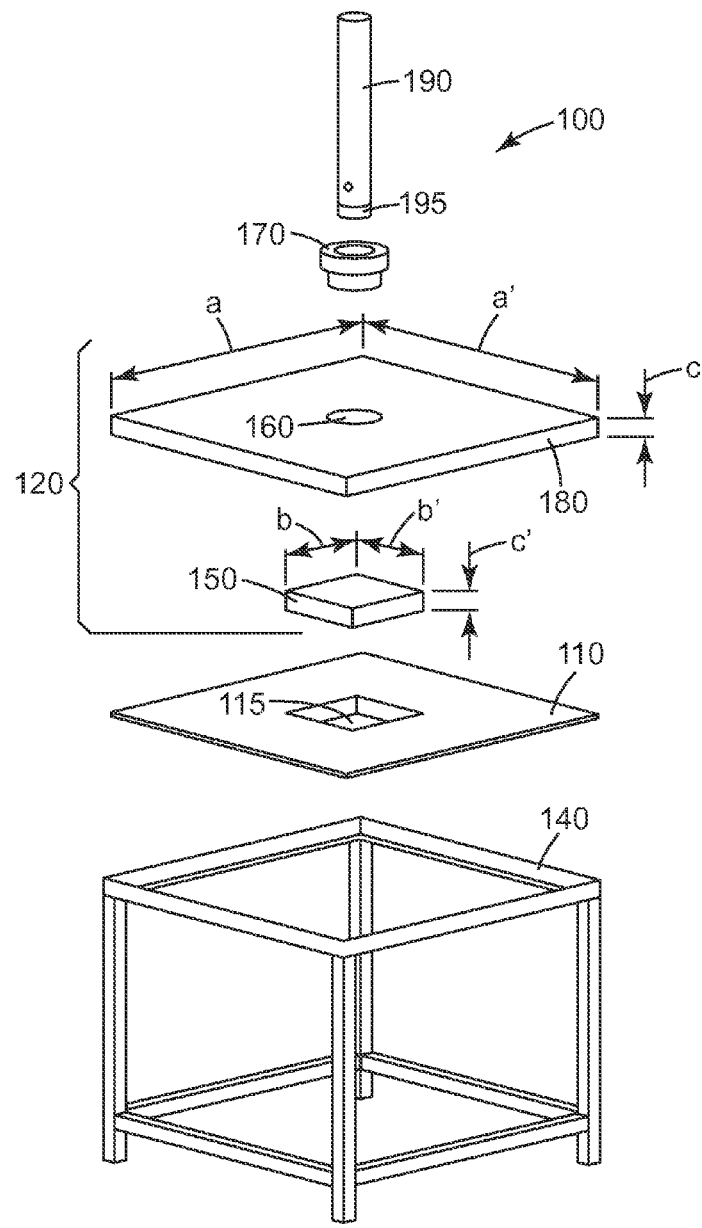
FIG. 2 is an exploded view of a test apparatus for measuring performance of a composite reinforcing coating of the description on simulated slow rock movement.
Figure 3:
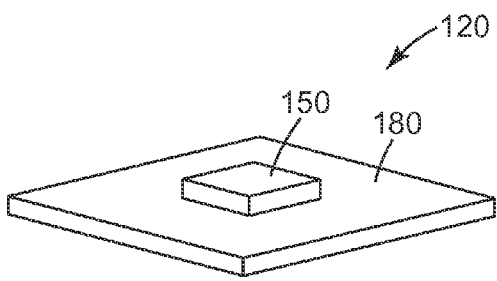
FIG. 3 is a representation of two test rocks oriented for application of a composite reinforcing coating of the description and subsequent testing in the apparatus of FIG. 2.

A "Rock on Rock" test was performed to simulate slow loose rock movement and observe failure mode, and an INSTRON-based test apparatus will now be described, referring to FIGS. 2 and 3. Apparatus 100 has stand 140 positioned to support a large water cut, unpolished granite slab 180, which has sides of length a and a', and defines a centrally located opening 160, which typically has a diameter of about 3 inches. Small granite slab 150 has sides of length b and b'. Typically, a and a' are both about 20 inches in length, and b and b' are both about 6 inches in length. The two granite slabs have thicknesses c and c', which are both typically about 1.2 inches in thickness. To conduct the test, small granite slab 150 is positioned centrally on a major surface of large granite slab 180 to form slab assembly 120, with slab 150 centered over opening 160, as shown in FIG. 3, and then coating layers are sprayed on the top surface of the rocks, to form polymeric liner 110, which may, for example, be a composite of two layers, including a foam layer of the current description, covering and adhered to both slab 180 and slab 150, and a reinforcing layer of the current description, covering and adhered to the foam layer. Small granite slab 150 is not otherwise anchored to the large granite slab 180. It will be understood that polymeric liner 110 in exploded view FIG. 2 is adhered onto slabs 180 and 150, with small slab 150 being located in recessed region 115 of polymeric liner 110. The granite slab assembly 120, coated with polymeric liner 110, is placed on stand 140 so that small granite slab 150 is positioned beneath large granite slab 180. INSTRON plunger 190, having replaceable tip 195, is introduced through plunger guide 170 and pressed against small granite slab 150 at a selected rate of travel until the polymeric liner 110 fails, or if the coating does not fail, the machine peak load is noted. The rate of travel of the INSTRON plunger against small granite slab 150 is a variable, with 5 millimeters/minute (mm/min.) being a typical value.

In some instances, where the strength of the reinforced coating exceeded the capability of the INSTRON device, the "Rock on Rock" test was carried out at CANMET using a larger load cell testing device.

An adapation of a "Round Determinant Panel" (RDP) test was performed by adapting the flexural toughness test of ASTM C-1550-08, which uses a center-loaded round panel of shotcrete, with or without steel fiber reinforcement. In the adapted RDP test, a panel of shotcrete was coated with a foam layer of about 4 mm to 6 mm and a reinforcing layer of about 3 mm, and the flexural toughness of the coated panel of shotcrete was then measured using the standard testing protocol.

Materials:

| Material | Description | Supplier |
| --- | --- | --- |
| ATH DH-35 | aluminum trihydrate | |
| D-2000 | JEFFAMINE D-2000, polyetheramine | Huntsman Corp. (The Woodlands, TX) |
| DEG | diethylene glycol | |
| DETDA | diethyltoluenediamine | Albemarle (Baton Rouge, LA) |
| EG-711 | VORATRON EG-711, zeolite paste, moisture scavanger | Dow Chemical (Midland, MI) |
| HARTCURE 30 | di-(methylthio)toluenediamine | Johnson Fine Chemical Co., Ltd. (Taichung City, TW) |
| HXI 1229 | polymeric isocyanate | The Hanson Group LLC (Duluth, GA) |
| HXI 1624 | polymeric isocyanate | The Hanson Group LLC (Duluth, GA) |

-continued

| Material | Description | Supplier |
|---|---|---|
| LV-33 | DABCO LV-33, 33% triethylenediamine and 67% dipropylene glycol; blowing catalyst | Air Products (Allentown, PA) |
| MBOEA | ACETOCURE, 4,4'-methylenebis(o-ethylaniline) | Aceto Chemicals (Lake Success, NY) |
| MX 717 | coreshell rubber in 1000 MW polyethylene glycol, OH No. 84 | Kaneka Texas Corp. (Pasedena, TX) |
| MX-TCPP | tris(chloroisopropyl)phosphate; flame retardant/toughener. | Kaneka Texas Corp. (Pasedena, TX) |
| NC 630 | Specflex NC360, high functionality capped polyol | Dow Chemical (Midland, MI) |
| PG 40-800 | polyether polyol, OH No. 800 | Arch Chemicals (Norwalk, CT) |
| PG 70-600 | amine based polyol, OH No. 600 | Arch Chemicals (Norwalk, CT) |
| PG 74-376 | sucrose based polyol, OH No. 375 | Arch Chemicals (Norwalk, CT) |
| PM 200 | WANNATE PM 200, polymethane polyphenyl isocyanate, NCO 30-32%; high functionality polymeric MDI. | Yantai Wanhau Polyurethanes Co. Ltd (Yantai, China) |
| POLYLINK 4200 | 4,4'-methylenebis(N-(1-methylpropyl)benzenamine | Aceto Chemicals (Lake Success, NY) |
| QZ 270 | modified diphenylmethane diisocyanate, NCO 27-28% | ITWC Inc. (Malcolm, IA) |
| QZ E-16 | modified diphenylmethane diisocyanate, NCO 15.9-16.4% | ITWC Inc. (Malcolm, IA) |
| TCPP | tris(chloroisopropyl)phosphate; flame retardant/toughener. | Aceto Chemicals (Lake Success, NY) |
| TERATHANE 250 | polytetramethylene ether glycol | Invista (Witchita, KS) |
| Water | blowing agent | |

Example 1

Curable Foam Composition

TABLE 1

| | Description | % by Weight |
|---|---|---|
| $A_{FC}$ ingredient | | |
| PM 200 | high functionality polymeric MDI | 85 |
| TCPP | flame retardant/toughener | 15 |
| $B_{FC}$ ingredient | | |
| DEG | diethylene glycol | 10 |
| PG 40-800 | diol | 20 |
| NC 630 | high functionality capped polyol | 67.5 |
| LV-33 | catalyst | 1.0 |
| Water | blowing agent | 1.5 |

This formulation is illustrative of the type of curable foam composition useful in the composite approach of the current description. Parts $A_{FC}$ and $B_{FC}$ in Table 1 were each prepared separately according to practices used with preparation of urethane reactive materials, using the materials indicated.

The corresponding parts $A_{FC}$ and $B_{FC}$ were then combined through high pressure spray equipment, in a 1:1 ratio, using spray equipment Reactor E-XP1 or equivalent. Heat for curing the curable foam composition was generated from the exothermic reaction of $A_{FC}$ with $B_{FC}$. The reaction produced a self-skinning, closed cell foam, having a density of 8.9 lbs/cu. ft. (143 kg/m$^3$).

Examples 2-9

Curable Reinforcing Composition

For each of examples 2 through 9, a reinforcing polyisocyanate component $A_{RC}$ (Table 2A) and a reinforcing polyamine component $B_{RC}$ (Table 2B) were each prepared separately according to practices used with preparation of urethane reactive materials, using the materials indicated in Tables 2A and 2B, respectively. For each example number, the corresponding components $A_{RC}$ and $B_{RC}$ were then combined through high pressure spray equipment, typically in a 1:1 ratio, using spray equipment Reactor E-XP1 or equivalent, and were sprayed onto high density polyethylene, and the resulting films were peeled off after application and then cut into dogbone-shaped strips for subsequent testing. The combining of component $A_{RC}$ with component $B_{RC}$ resulted in an exothermic reaction to at least partially cure the coatings.

TABLE 2A

| | | Example No. | | | | | | | |
|---|---|---|---|---|---|---|---|---|---|
| $A_{RC}$ ingredient | Description | 2 | 3 | 4 | 5 | 6 | 7 | 8 | 9 |
| | | % by Weight | | | | | | | |
| HXI 1229 | polymeric isocyanate | — | — | — | 50 | — | — | — | — |
| HXI 1624 | polymeric isocyanate | — | — | — | 50 | — | — | — | — |
| PM 200 | polymeric MDI, NCO 30-32% | 100 | 100 | 81.5 | — | — | — | — | — |
| QZ 270 | modified diphenylmethane diisocyanate, NCO 27-28% | — | — | — | — | — | — | — | 68 |

TABLE 2A-continued

| $A_{RC}$ ingredient | Description | 2 | 3 | 4 | 5 | 6 | 7 | 8 | 9 |
|---|---|---|---|---|---|---|---|---|---|
| | | | | | Example No. % by Weight | | | | |
| QZ E-16 | modified diphenylmethane diisocyanate, NCO 15.9-16.4% | — | — | — | — | 100 | 100 | 100 | 22 |
| TCPP | flame retardant | — | — | 18.5 | — | — | — | — | 10 |

TABLE 2B

| $B_{RC}$ ingredient | Description | 2 | 3 | 4 | 5 | 6 | 7 | 8 | 9 |
|---|---|---|---|---|---|---|---|---|---|
| | | | | | Example No. % by Weight | | | | |
| ATH DH-35 | aluminum trihydrate | — | — | 10 | — | — | — | — | 7.5 |
| D-2000 | polyetheramine | — | — | — | 30 | 25 | 55 | 65 | 6.5 |
| DEG | diethylene glycol | — | 10 | — | — | — | — | — | — |
| DETDA | diethyltoluenediamine | 5 | — | 5 | — | — | — | 20 | — |
| EG-711 | moisture scavanger | 5 | 5 | 5 | — | — | — | — | 5 |
| HARTCURE 30 | di-(methylthio)toluenediamine | — | — | — | — | 5 | 5 | 5 | — |
| MBOEA | 4,4'-methylenebis(o-ethylaniline) | — | — | — | 30 | 30 | 30 | — | 7.5 |
| MX 717 | coreshell rubber in 1000 MW polyethylene glycol, OH No. 84 | — | 10 | 10 | — | — | — | — | — |
| MX-TCPP | flame retardant/toughener | — | — | — | — | — | — | — | 15 |
| PG 40-800 | polyether polyol, OH No. 800 | 10 | — | — | — | — | — | — | — |
| PG 70-600 | amine based polyol, OH No. 600 | 30 | 25 | 15 | — | — | — | — | 7.5 |
| PG 74-376 | sucrose based polyol, OH No. 375 | 50 | 25 | 25 | — | — | — | — | 15 |
| POLYLINK 4200 | 4,4'-methylenebis(N-(1-methylpropyl)benzenamine | — | — | — | 10 | 10 | 10 | 10 | 2.5 |
| TCPP | flame retardant/toughener | — | — | — | 30 | 30 | — | — | — |
| TERATHANE 250 | polytetramethylene ether glycol | — | 25 | 30 | — | — | — | — | 33.5 |

Samples of the resulting reinforcing layers were tested according to standard methods, and the results are shown in the following tables (reported values are typically an average of results for 5 samples): tensile strength (per ASTM D412-06ae2, Table 3); elongation (per ASTM D412-06ae2, Table 4); tear strength (per ASTM D624-00 (2007), Table 5); and Table 6 shows values for hardness (ASTM D2240-05), gel tack time (ASTM D7487-08) and tack free time (ASTM D7487-08).

TABLE 3

| Example No. | Tensile strength (MPa), room temperature, at the indicated time | | | | | | | |
|---|---|---|---|---|---|---|---|---|
| | 1 h | 2 h | 16 h | 18 h | 20 h | 24 h | 72 h | 96 h |
| 2 | — | — | — | — | — | 57.8 | — | — |
| 3 | 18.1 | 32 | — | — | — | — | — | — |
| 4 | — | — | — | — | 10.8 | — | — | — |
| 5 | — | 6.1 | — | — | — | 9.1 | 11.8 | — |
| 6 | — | 9.5 | 11.4 | — | — | 11.4 | 12.7 | — |
| 7 | — | 10.3 | 17.9 | — | — | 16.8 | 20.6 | — |
| 8 | — | 6.5 | 13.1 | — | — | 16.2 | 17.4 | — |
| 9 | — | 13.9 | — | 17.3 | — | 18.4 | — | 22.7 |

TABLE 4

| Example No. | % Elongation, room temperature, at the indicated time | | | | | | | |
|---|---|---|---|---|---|---|---|---|
| | 1 h | 2 h | 16 h | 18 h | 20 h | 24 h | 72 h | 96 h |
| 2 | — | — | — | — | 10.5 | — | — | — |
| 3 | 58.7 | 26 | — | — | — | — | — | — |
| 4 | — | — | — | — | 17 | — | — | — |
| 5 | — | 36 | — | — | — | 121 | 181 | — |
| 6 | — | 11 | 43 | — | — | 75 | 59 | — |
| 7 | — | 82 | 188 | — | — | 131 | 190 | — |
| 8 | — | 95 | 218 | — | — | 253 | 234 | — |
| 9 | — | 130 | 105 | 62 | — | 66 | — | 57 |

TABLE 5

| Example No. | Tear strength at the indicated time, in pound force per linear inch (with kN/m value in parentheses) | | | | | | |
|---|---|---|---|---|---|---|---|
| | 2 h | 16 h | 18 h | 20 h | 24 h | 72 h | 96 h |
| 6 | 300 (53) | 490 (86) | — | — | 473 (83) | 584 (102) | — |
| 7 | — | 651 (114) | — | — | 646 (113) | 713 (125) | — |
| 8 | — | 472 (83) | — | — | 477 (84) | 559 (98) | — |
| 9 | 306 (54) | — | 473 (83) | — | 473 (83) | — | 559 (98) |

In addition to the tear strength data shown in Table 5, the tear strength for Example No. 5 was measured under accelerated testing conditions having a temperature of 71° C., and the 20 h tear strength was observed to be 288 pound force per linear inch (or 50.5 kN/m).

TABLE 6

| Example No. | Hardness | Gel tack time | Tack free time |
|---|---|---|---|
| 6 | 55D | 2 sec. | 3 sec. |
| 7 | 55D | 2 sec. | 3 sec. |
| 8 | 55D | 5 sec. | 9 sec. |
| 9 | 70D | 2 sec. | 4 sec. |

Example 10

Composite Reinforced Coating, Using the Curable Reinforcing Composition of Example 2

Figure 4:
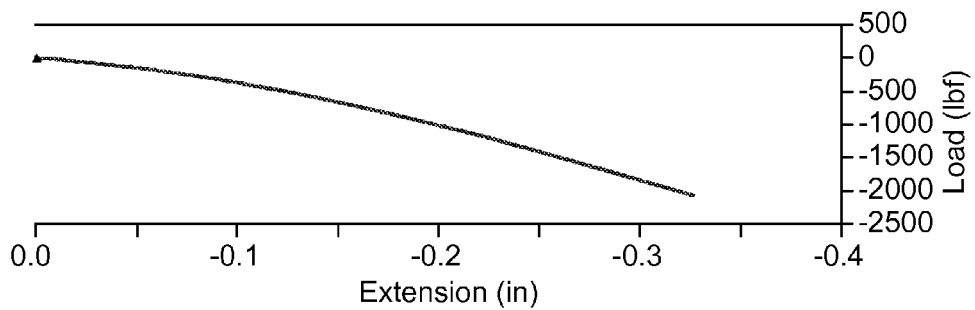
FIGS. 4 and 5 are graphs of extension vs. load data for a "Rock on Rock" test of a composite reinforcing coating of the current description.
Figure 7:
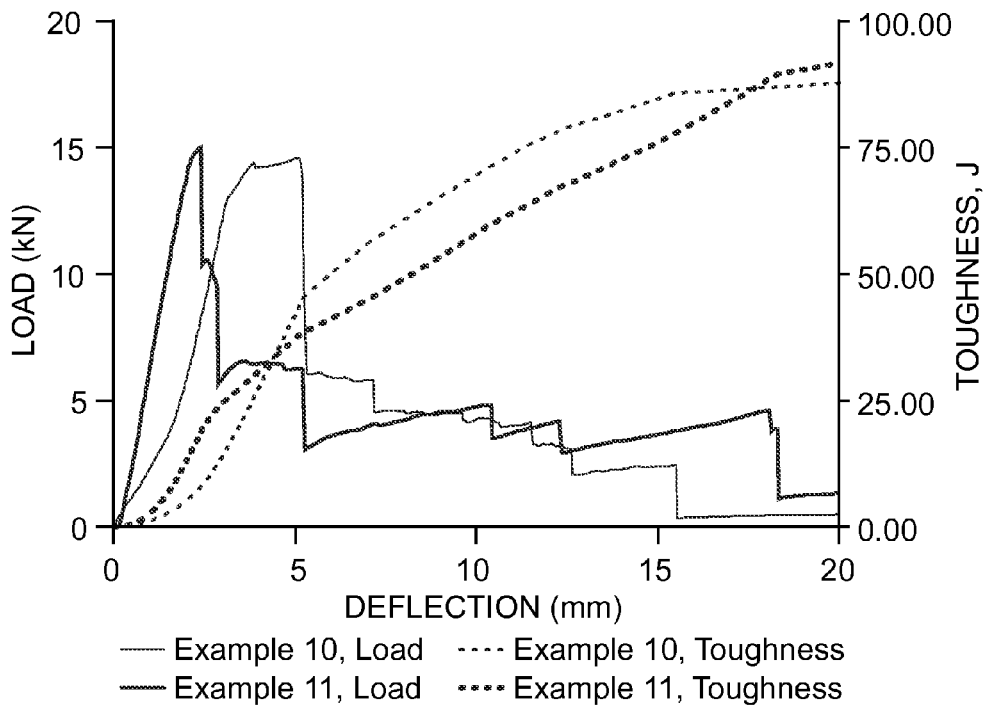
FIG. 7 is a graph of "Rock on Rock" test data showing deflection vs. load and deflection vs. toughness for composite reinforcing coatings of the current description.

A composite reinforced coating was prepared by application of a curable foam composition of Example 1 to form a foam layer on an assembly of granite slabs as described for the "Rock on Rock" test, followed by application of the curable reinforcing layer of Example 2 to the foam layer to, to give a composite reinforced coating. The composite coating was allowed to cure for 1 week at ambient temperature, and under a compressive load of 5 mm/min., the composite coating of foam layer and reinforcing layer did not fail at a machine peak load of 2085 lbf (pound-force; 9.27 kiloNewtons; see extension vs. load plot in FIG. 4), but the INSTRON base was beginning to deform. The same composite coating (i.e., foam layer of Example 1 in combination with reinforcing layer of Example 2) was tested in a larger testing apparatus at CANMET, giving the deflection (in mm) vs. load (in kiloNewtons, kN) and deflection (in mm) vs. toughness (in Joules, J) data shown in FIG. 7 (shown as Example 10).

Example 11

Composite Reinforced Coating, Using the Curable Reinforcing Composition of Example 3

Figure 5:
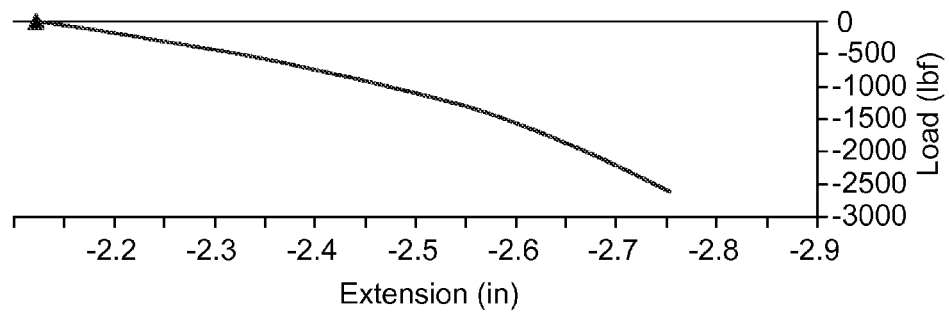

A composite reinforced coating was prepared as in Example 10, except that the curable reinforcing composition used was that of Example 3 above. After allowing the coating to age for 1 week, the "Rock on Rock" test was performed, and FIG. 5 shows that the composite coating did not fail under a 5 mm/min. compression force, with a machine peak load of 2621 lbf (11.7 kiloNewtons). The same composite coating (i.e., foam layer of Example 1 in combination with reinforcing layer of Example 3) was tested in a larger testing apparatus at CANMET, giving the deflection (in mm) vs. load (in kiloNewtons, kN) and deflection (in mm) vs. toughness (in Joules, J) data shown in FIG. 7 (shown as Example 11).

The specification for ground support using wire mesh screen is that the screen be able to support 500 kg/m$^2$. From the above load data, Total load capabilities were calculated from the above load data, assuming distribution of the load over a 6 inch square surface (i.e., 36 sq. in., or 232 cm$^2$) of greater than 40,700 kg/m$^2$ and greater than 51,000 kg/m$^2$, for the reinforced coating of Examples 10 and 11, respectively.

Figure 6:
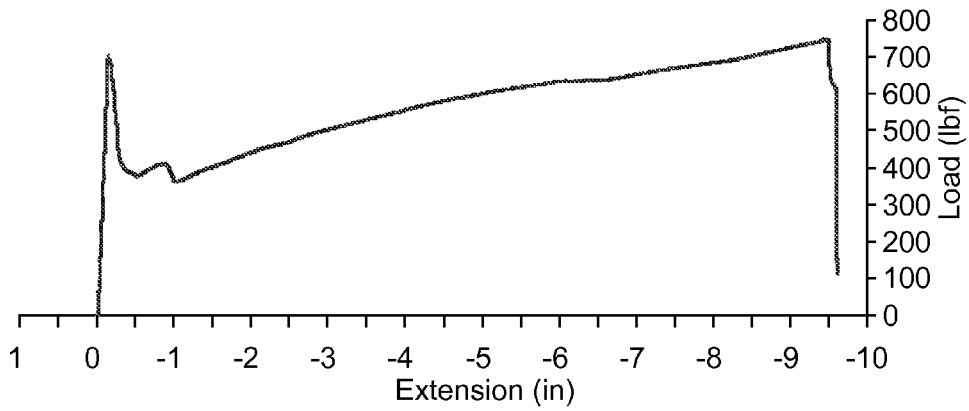
FIG. 6 is a graph of extension vs. load data for a "Rock on Rock" test of a comparative example coating.

As a comparative example in the "Rock on Rock" test, a liner of the composition described in U.S. Pat. No. 7,011,865 (similar to Example 14 therein, with added flame retardant) was applied to the granite rocks of apparatus 100 described in the test method section, was allowed to age for 1 week, and under a compressive load of 5 mm/min. the extension vs. load profile shown in FIG. 6 was observed. The machine peak load at failure of the coating was about 750 lbf (about 3.3 kiloNewtons).

Example 12

Reinforcement Coating in Round Panel Test

Figure 8:
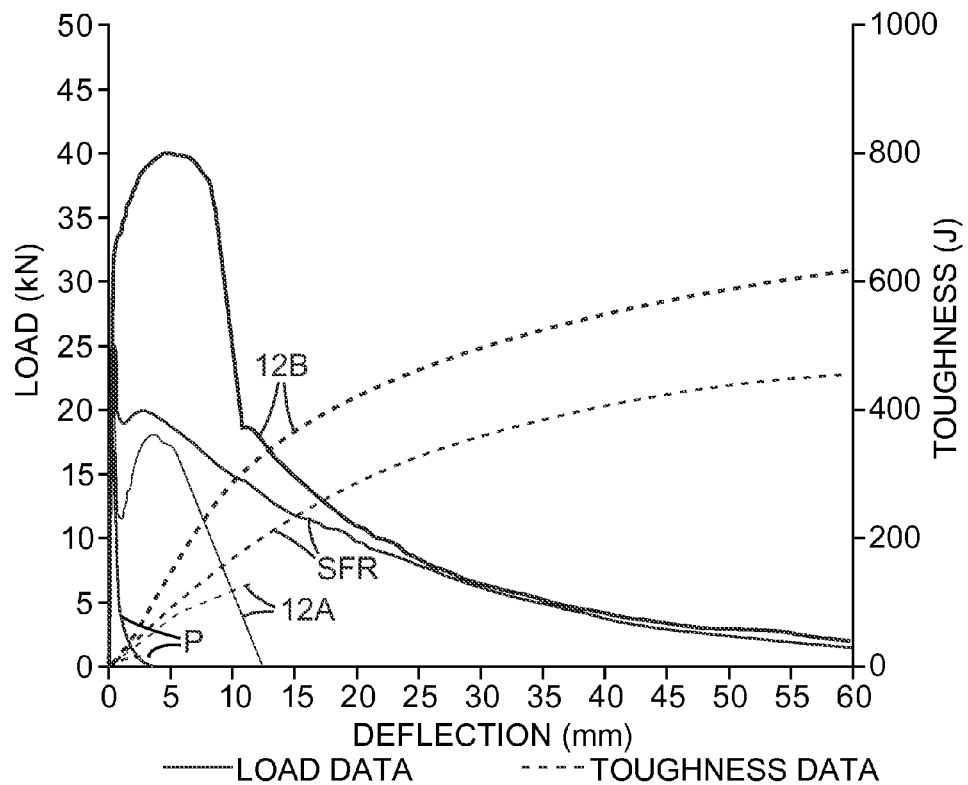
FIG. 8 is a graph of test data showing deflection vs. load and deflection vs. toughness for composite reinforcing coatings of the current description.

Round determinant panel (RDP) tests were performed according to ASTM C-1550-08 with the modification that shotcrete rounds were coated with the foam layer of Example 1 having a thickness of about 4 mm to 6 mm and the reinforcing layer of Example 2 having a thickness of about 3 mm, with and without steel fiber reinforcement added to the shotcrete. In Example 12A, the coated shotcrete round was plain (i.e., did not have added steel fibers). In Example 12B, a coated and steel fiber-reinforced shotcrete round was used. The deflection (in mm) vs. load (in kiloNewtons, kN) and deflection (in mm) vs. toughness (in Joules, J) data is shown in FIG. 8. Data for an uncoated plain shotcrete round (P) and for an uncoated steel fiber-reinforced shotcrete round (SFR) are also indicated in FIG. 8. Examples 12A and 12B are seen to have greater load capability and toughness when compared with the corresponding uncoated shotcrete rounds (P and SFR, respectively).

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

What is claimed is:

1. A method for providing a reinforcing coating on an irregular rock or concrete surface, the method comprising:
   a) applying a curable foam composition onto at least a portion of a surface, wherein the surface is selected from a group consisting of an irregular rock surface and an irregular concrete surface and combinations thereof, and wherein the curable foam composition comprises a mixture of a foam composition polyisocyanate component and a foam composition polyol component;
   b) at least partially curing the curable foam composition to form a polyurethane foam layer, wherein at least a portion of the foam layer is adhered to the surface;
   c) applying a curable reinforcing composition onto at least a portion of the foam layer, wherein the curable reinforcing composition comprises a reinforcing composition polyisocyanate component and a reinforcing composition polyamine component, wherein the reinforcing composition polyisocyanate component has an isocyanate number in a range from 27% to 32%, the curable reinforcing composition further comprising at least one of a flow agent or a de-aeration agent;
   d) at least partially curing the curable reinforcing composition to form a polyurea reinforcing layer, wherein at least a portion of the reinforcing layer is adhered to the foam layer, thereby forming the reinforcing coating on the surface.

2. The method of claim 1, wherein the surface is a portion of a mine.

3. The method of claim 2 wherein the portion of the mine is selected from the group consisting of a wall, a back, a face, and combinations thereof.

4. The method of claim 1 wherein the applying in steps (a) and (c) comprises spraying.

5. The method of claim 1 wherein the curable foam composition further comprises water in an amount of 0.5% by wt. to 5% by wt.

6. The method of claim 1 wherein step (a) comprises heating at least a portion of the curable foam composition to a temperature in the range of from about 50° C. to about 70° C.

7. The method of claim 1 wherein the curing in step b comprises an exothermic reaction of the curable foam composition.

8. The method of claim 7 wherein the foam layer has an integral skin.

9. The method of claim 1 wherein the reinforcing layer has a tensile strength value as measured according to ASTM D412-06ae2 of at least 20 MPa.

10. The method of claim 1 wherein the reinforcing layer has a percent elongation value as measured according to ASTM D412-06ae2 of at least 200 percent.

11. The method of claim 1 wherein the reinforcing layer has a tear resistance value as measured according to ASTM D624-00(2007) of at least 122 kilonewtons per meter.

12. A surface of a mine coated using the method of claim 1.

13. A composite comprising:
a surface of a mine; and
a reinforcing coating disposed on at least a portion of the surface of the mine, the reinforcing coating comprising:
a foam layer adhered to at least a portion of the surface of the mine, wherein the foam layer comprises a polyurethane; and
a reinforcing layer adhered to at least a portion of the foam layer, wherein the reinforcing layer comprises a polyurea, wherein the polyurea is formed from a curable reinforcing composition comprising a reinforcing composition polyisocyanate component and a reinforcing composition polyamine component, wherein the reinforcing composition polyisocyanate component has an isocyanate number in a range from 27% to 32%, the curable reinforcing composition further comprising at least one of a flow agent or a de-aeration agent;
wherein the surface of the mine is a portion of the mine selected from a group consisting of a wall, a floor, a back, and combinations thereof.

14. The composite of claim 13, wherein the foam layer has a density in the range of from about 40 kg/m$^3$ to about 144 kg/m$^3$.

15. The composite of claim 13 wherein the reinforcing layer has a tensile strength value as measured according to ASTM D412-06ae2 of at least 20 MPa.

16. The composite of claim 13 wherein the reinforcing layer has a percent elongation value as measured according to ASTM D412-06ae2 of at least 200 percent.

17. The composite of claim 13 wherein the reinforcing layer has a tear resistance value as measured according to ASTM D624-00(2007) of at least 122 kilonewtons per meter.

* * * * *